(12) United States Patent
McKnight

(10) Patent No.: US 6,700,557 B1
(45) Date of Patent: Mar. 2, 2004

(54) ELECTRODE BORDER FOR SPATIAL LIGHT MODULATING DISPLAYS

(75) Inventor: Douglas McKnight, Boulder, CO (US)

(73) Assignee: Three-Five Systems, Inc., Tempe, AZ (US)

( * ) Notice: Subject to any disclaimer, the term of this patent is extended or adjusted under 35 U.S.C. 154(b) by 0 days.

(21) Appl. No.: 09/520,682

(22) Filed: Mar. 7, 2000

(51) Int. Cl.[7] .................................................. G09G 3/36
(52) U.S. Cl. .............................. 345/87; 345/88; 345/90; 345/103; 345/1.1; 345/1.3; 345/67; 345/698; 345/94; 348/383
(58) Field of Search .............................. 345/87, 90, 103, 345/94, 1.1, 1.3, 67, 698, 88; 348/383

(56) References Cited

U.S. PATENT DOCUMENTS

| | | | | |
|---|---|---|---|---|
| 4,655,554 A | * | 4/1987 | Armitage | ..................... 365/100 |
| 5,155,609 A | * | 10/1992 | Konno et al. | .................. 359/71 |
| 5,198,920 A | * | 3/1993 | Gobeli et al. | ................ 359/245 |
| 5,742,261 A | * | 4/1998 | Yuki et al. | ....................... 345/3 |
| 5,805,274 A | * | 9/1998 | Saita | ............................ 355/38 |
| 5,877,888 A | * | 3/1999 | Coleman | ..................... 359/267 |
| 6,140,980 A | * | 10/2000 | Spitzer et al. | .................. 345/8 |

* cited by examiner

Primary Examiner—Richard Hjerpe
Assistant Examiner—Abbas Abdulselam
(74) Attorney, Agent, or Firm—Ingrassia Fisher & Lorenz, PC

(57) ABSTRACT

A display device operable to generate images and a border image is disclosed. The display device in one example of the invention comprises an electrode structure coupled to a spatial light modulator display layer. The electrode structure is configured to define an active display area. The display also comprises a first electrode surrounding the electrode structure and a second electrode coupled to the spatial light modulator display layer. The second electrode is located above the first electrode and a voltage difference between the second electrode and the first electrode is used to generate the border image.

23 Claims, 6 Drawing Sheets

ELECTRODE BORDER FOR SPATIAL LIGHT MODULATING DISPLAYS

FIELD OF THE INVENTION

The present invention relates to display technologies.

BACKGROUND

Improvements in portable electronics has led to new designs that support low power consumption and miniature device sizes. In conjunction with the advent of improved portable electronics, light weight and low power displays are also being developed. Accordingly, the combination of smaller portable electronics and new displays has resulted in a variety of miniature display devices with a multitude of applications.

Prior art miniature display devices use miniaturized cathode ray tubes to display images. Cathode ray tubes, however, create numerous disadvantages. One disadvantage results from the power requirements of the cathode ray tube. In particular, a cathode ray tube typically includes an electrode beam that requires a large amount of power. To facilitate the large power requirements, extraneous power supplies are typically attached to the exterior of the miniature display device. The extraneous power supply, however, reduces the portability of the miniature display device.

Another disadvantage of using cathode ray tubes in miniature display devices results from the size requirements of the cathode ray tube. The design characteristics of cathode ray tubes requires minimum sizing of components. Specifically, the electrode beam used to generate images in the cathode ray tube must have a minimum displacement from the screen area of the cathode ray tube. Accordingly, the size requirements of the cathode ray tube make the cathode ray tube (CRT) impractical for use in most miniature display devices. For example, in miniature displays (such as head-mounted displays) where a wide range of peripheral vision and mobility is required the power and size requirements of cathode ray tubes make the use of cathode ray tubes impractical.

Spatial light modulators, such as liquid crystal displays, do not have many of the disadvantages of CRTs. Liquid crystal displays create an image by using an electric field to control the transmission of light through a liquid crystal.

FIG. 1 illustrates a prior art liquid crystal display. In particular, cell 100 shows a reflective liquid crystal display ("LCD"). Cell 100 includes a liquid crystal layer, 130, coupled between layer 105, layer 150, and four mechanical borders. For illustrative purposes only two mechanical borders, spacer 110 and spacer 140, are shown. The mechanical borders are used to maintain a predetermined space between layer 105 and layer 150. Accordingly, layers 105 and 150 in conjunction with the four mechanical borders are used to contain liquid crystal layer 130 and maintain the structural integrity of cell 100.

Cell 100 uses incident light, light source 105, to generate an image on layer 155. In one particular example of cell 100, light source 105 is polarized before it passes through layer 155 and enters liquid crystal 130 with a polarization plane at 45° to liquid crystal 130's molecular orientation. Subsequently, the polarized light is reflected on mirror 120 and returns through layer 155. In this example, the reflected light is transmitted through an analyzing polarizer as long as the polarization of the light is changed by the liquid crystal layer 130.

To generate an image, cell 100 changes the polarization of light passing through an area within liquid crystal 130. In particular, cell 100 includes a single transparent control electrode, layer 150 made from indium tin oxide. Cell 100 also includes an array of pixel electrodes (which may themselves form the mirror 120). Each electrode of the array of pixel electrodes, electrode 115, corresponds to a pixel of a generated image.

For example, to generate a single pixel image, cell 100 applies a voltage between a particular pixel electrode 115 and layer 150 using pixel electrode logic (not shown) and driver circuitry (not shown). The voltage difference between electrode 115 and layer 150 creates an electric field across liquid crystal layer 130. The field, in turn, changes the orientation of the molecules located in the liquid crystal 130, thus changing the polarization of light passing through the liquid crystal subjugated to the field. Accordingly, the changed polarized region of the liquid display layer 130 allows light from light source 105 to traverse from the mirror 120 across cell 100 and through the output analyzing polarizer (not shown). Thus, the contrast between the darkened and light regions of liquid crystal layer 130 creates the single pixel image on layer 155.

To generate a color image, cell 100 may use a time sequential color display system. In a time sequential color display system three light sources (e.g., a red light, a green light, and a blue light—i.e. RGB light source) are sequentially illuminated upon liquid crystal layer 130. Cell 100 also includes synchronizing signals and logic (not show) that coordinate the transition between the different light sources and modulate the voltages applied to the array of transparent pixel electrodes. Using the three light sources, the synchronizing logic, and the synchronizing signals, cell 100 displays color images on layer 155.

The light weight and low power design characteristics of a liquid crystal display ("LCD") makes the LCD ideal for use in head-mounted displays. For example, Provisional U.S. Patent Application No. 60/070,216, filed on Dec. 31, 1997, entitled "AN IMAGE GENERATOR HAVING A MINIATURE DISPLAY DEVICE" describes a head-mounted display uses in conjunction with a LCD. Examples of specific LCDs that may be used in miniature display devices may also be found in U.S. patent application Ser. No. 08/801,994, filed on Feb. 18, 1997, entitled "DISPLAY SYSTEM HAVING ELECTRODE MODULATION TO ALTER A STATE OF AN ELECTRO-OPTIC LAYER." The patent application entitled "DISPLAY SYSTEM HAVING ELECTRODE MODULATION TO ALTER A STATE OF AN ELECTRO-OPTIC LAYER" (Ser. No. 08/801,994, filed on Feb. 18, 1997) is hereby incorporated by reference.

Using a LCD in a head-mounted display provides advantages in terms of weight and power consumption, however, the use of LCDs in head-mounted displays also results in numerous disadvantages. One disadvantage results from the motion of the user wearing the head-mounted display. In particular, when the user's head moves relative to the head-mounted display's magnifying mirrors or lenses the user loses his/her field of vision. Accordingly, the user is unable to determine the circumference or perimeter of the liquid crystal's active display area. The active display area defines the region of the liquid crystal display that is displaying a generated image. The active display area also defines the liquid crystal region and accompanying electrodes used to generate an image. Even when the user's head does not move, the user may not realize that he/she is not seeing the entire active display area.

Another disadvantage results from using software to define an active display area in head-mounted displays. In particular, using software to define an active display area for a head-mounted display requires a specialized operating system. For example, software may place items within windows, and the software may create a border at the edge of the active display area. However, using software to define an active display area requires allocating pixel electrodes to define an active display area. The allocation of electrodes results in a loss of displayable image area.

SUMMARY OF THE INVENTION

A display device operable to generate images and a border image is disclosed. The display device in one example of the invention comprises an electrode structure coupled to a spatial light modulator display layer. The electrode structure is configured to define an active display area. The display of this example also comprises a first electrode surrounding the electrode structure and a second electrode coupled to the spatial modulator display layer. The second electrode is located above the first electrode, and a voltage difference between the second electrode and the first electrode is used to generate the border image.

In one particular example of the invention, the electrode structure is a rectangular array of pixel electrodes disposed on a single crystal silicon substrate. The second electrode is a transparent electrode, such as an Indium Tin Oxide (ITO) electrode on a cover glass which is above a nematic liquid crystal layer and the silicon substrate. The cover glass and the silicon substrate create a sandwich with the liquid crystal layer between the cover glass and the silicon substrate. The pixel electrodes form a mirror which reflects incident light back through the liquid crystal layer. A rectangular border electrode is also disposed on the silicon substrate and surrounds the array of pixel electrodes. The border electrode is also reflective and is separately controlled electrically so that its voltage (relative to the ITO layer) is set separately relative to the pixel electrodes. In this manner, an independently colored border may be set around the array of pixel electrodes by setting a voltage difference between the border electrode and the ITO layer independently of any of the voltages of the pixel electrodes.

In another example of the invention, a display device includes a border electrode structure which surrounds an active display area. The border electrode structure is operatively coupled to a light modulator which is capable of modulating light in response to an electromagnetic signal created by the border electrode structure.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

Figure 1:
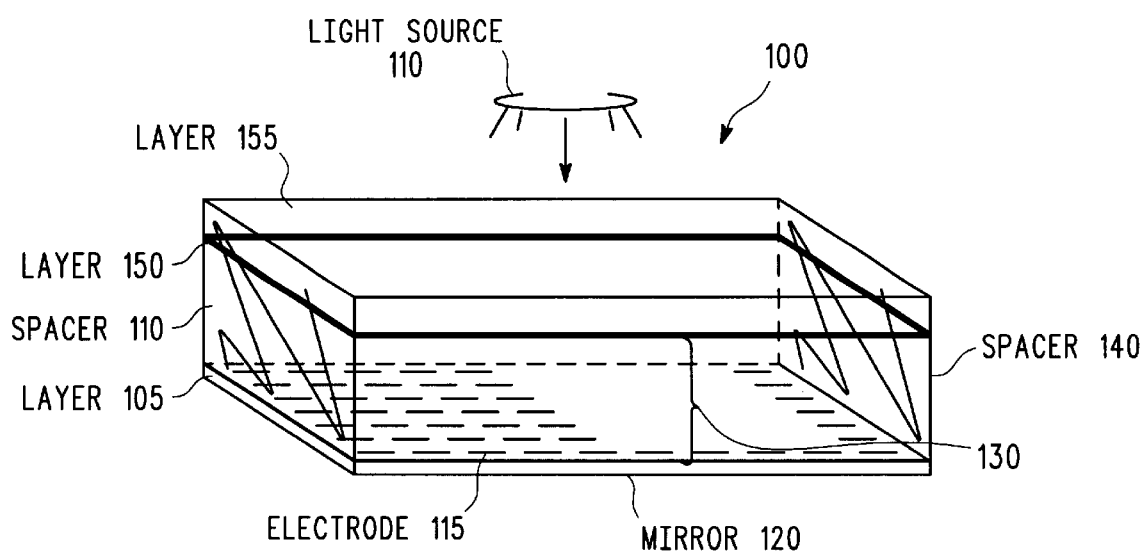
FIG. 1 shows a prior art liquid crystal display.

The present invention provides an electrode structure disposed relative to a display area so that the electrode structure creates a border around the display area. The present invention is described with reference to certain specific examples of electrode structures and display mechanisms, such as spatial light modulators. It will be understood that alternative geometries of the electrode structure, and alternative types of display mechanisms such as spatial light modulators are also within the scope of the invention.

An electrode border used to define an active display area in a display device is disclosed. The electrode border is in one example of the invention enclosed between a liquid crystal display's cover glass and a substrate layer. The electrode border allows a user of a miniature display device to determine the circumference of an active display area without relying on mechanical borders and without relying on the use of addressable pixel electrodes to generate a border. For one embodiment, the electrode border is included in a liquid crystal display that uses a transmissive light source to generate images. For an alternative embodiment, the electrode border is included in a liquid crystal display that uses reflected light to generate images. An example of this alternative embodiment is a reflective liquid crystal on silicon display device.

The electrode border defines an active display area despite the format of display area used. For example, for one embodiment, the electrode border is used to define the display area of an active matrix liquid crystal display. For an alternative embodiment, the electrode border is used to define the display area of a passive matrix liquid crystal display. In either case, the liquid crystal display may be transmissive or reflective. In one example, the display mechanism uses nematic liquid crystals. Other types of display mechanisms, which do not use nematic liquid crystals, such as plasma displays or ferro-electric liquid crystal displays or light emitting diode displays, may be used with an electrode structure which defines a border in a light modulating medium which is controlled by the electrode structure. The display mechanism may use either time sequential color (in which one pixel shows only one primary color at a time, and each primary color is rapidly shown in a time sequence) or spatial color (in which each "pixel" is actually several subpixels which each display substantially simultaneously one of the primary colors, such as red, green and blue).

An intended advantage of an embodiment of the present invention is to provide a liquid crystal display that allows a user of miniature display device to differentiate between an active display area and a non-active display area and to be able to determine whether all of the active display area is viewable. The border may be set to a particular color to differentiate the border from the active display area.

Another intended advantage of an embodiment of the present invention is to provide a surrounding border for images generated by a head-mounted display. For one embodiment, the head-mounted device uses a liquid crystal display to generate the images which are magnified through a magnifying lens. Accordingly, the surrounding border allows the user of the head-mounted display to determine the circumference of the active display area included in the liquid crystal display. Thus, the user is able to maintain a constant field of vision when using the head-mounted display and is able to determine whether the entire field of vision is viewable.

Yet another intended advantage of an embodiment of the present invention is to allow for relaxed manufacturing tolerances because a border of the present invention can be set to substantially the same color or brightness as the mechanical border which is positioned during display assembly.

Figure 2:
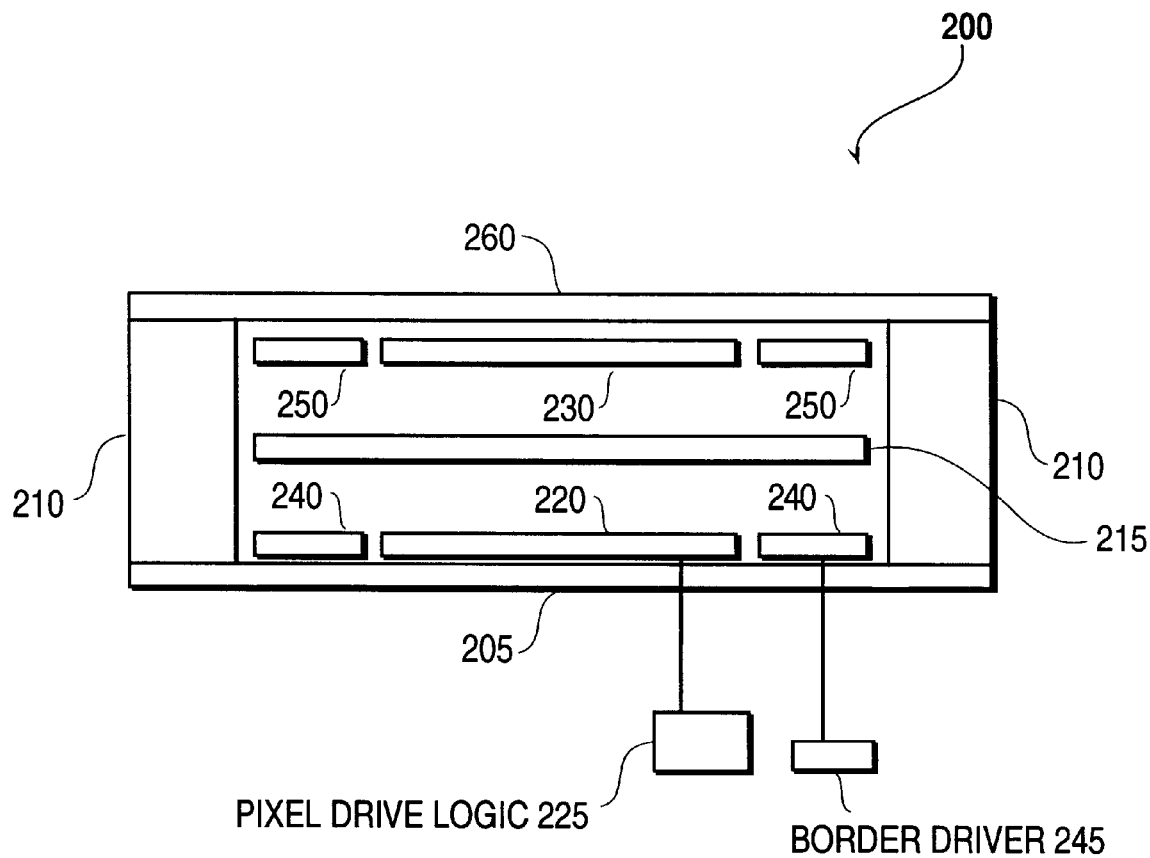
FIG. 2 illustrates one embodiment of a simplified cross section view of a display with an electrode border.

FIG. 2 illustrates one embodiment of a cross sectional view of a display with an electrode border. In particular, display 200 shows a mechanical border (spacer 210) coupled to a substrate layer (205), a transparent cover glass (260) which may be considered another substrate layer, a spatial light modulator display layer (215), and two electrode borders (250 and 240). Display 200 uses spacer 210 to define the physical boundaries of the device. In particular, spacer 210 is used to maintain the position of the different layers in display 200. The spacer 210 and the substrate layers 205 and 260 form a cavity for containing the spatial light modulator display layer 215. It will be appreciated that the layer 215 may fill the entire cavity formed by the spacer 210 and the substrate layers 205 and 260. The layer 215 is shown in FIG. 2 as not filling the space in order to keep the figure simple.

For one embodiment, display 200 is a time sequential color display system that uses a reflective liquid crystal display to generate images where the liquid crystal is disposed over mirrored pixel electrodes on an integrated circuit (IC). Accordingly, layer 215 may be a nematic liquid crystal, layer 205 is the substrate of the IC, and a RGB light source (not shown) is placed above layer 260. Layer 220 includes an array of pixel electrodes which are also mirrors used to create the images. Layer 230 is typically a single transparent control electrode (e.g. an Indium Tin Oxide layer which is deposited onto a surface of the cover glass 260). As previously described, generating a voltage difference between a pixel electrode and layer 230 varies the polarization of light passing through liquid crystal 215. Accordingly, via drive logic 225—also referred to as a display integrated circuit—display 200 independently varies the voltage on a group of pixel electrodes to generate an image. For example, for one embodiment, a single image is generated from a single frame of a sequential video stream. Thus, for each frame a group of pixel electrodes corresponding to the desired image are driven to specific voltages via drive logic 225. The color and intensity of the generated image is controlled by the voltage value applied to each pixel electrode used to describe the image. The color and intensity of the generated image is also controlled by the period of voltage transitions for each pixel electrode used to generate the image.

Display 200 also includes electrode border 240, electrode border 250, and border driver 245. For one embodiment, electrode border 240 comprises a single contiguous reflective electrode surrounding the pixel electrodes on layer 220. The width of electrode border 240, however, may be greater than the width of a pixel electrode on layer 220. Similarly, electrode border 250 is a single transparent control electrode (e.g. an Indium Tin Oxide layer formed as a border on cover glass 260) surrounding layer 230. Typically, a conventional alignment layer may be applied to the surface of the electrodes 230 and 250 which is adjacent to and in contact with the layer 215. For one embodiment, electrode border 250 is placed directly above electrode border 240 and is electrically separated from electrode layer 230 and has the same width as electrode border 240. In an alternative embodiment, electrode layer 230 is extended to cover electrode border 240 and there is no separate electrode border 250. The layer 215 extends between the border electrodes 240 and 250, and since the border electrode 240 is reflective and the border electrode 250 is transparent, light reflected from electrode 240 may have its polarization altered selectively by the configuration of the liquid crystal (in layer 215) in the vicinity of the border electrodes. This selective alteration is controlled by the electric field created by the voltage between the two border electrodes, and thus an image of a border may be created with these border electrodes.

Using the electrode borders 240 and 250 and driver 245 which is coupled to these borders 240 and 250, display 200 defines an active display area on cover glass 260 by displaying a border (e.g. a colored rectangular box) around the pixel electrode array which defines the active display area. Accordingly, the electrode borders do not receive display data similar to the pixel electrodes in layer 220. Instead, a direct current ("DC") voltage that is DC balanced over time at some reference voltage is set between electrode border 240 and electrode border 250, thus creating a border image (e.g. a colored border) that is distinguishable from the active display area. For example, for one embodiment, voltage driver 245 generates a repetitive voltage swing between electrode border 240 and electrode border 250 for each frame. Thus, the absolute value of the voltage across the layer 215 in the vicinity of electrodes 240 and 250 remains the same but the polarity of the voltage changes in each swing. The cyclical voltage pattern generates a constant border image on cover glass 260. For an alternative embodiment where electrode border 250 is not present and layer 230 is extended to cover electrode border 240, the border image follows the dimensions of electrode border 240. In this alternative embodiment where electrode border 250 is not present, the layer 230 serves as both an electrode for the pixel region (e.g. the active display area) and an electrode for the border region. This alternative embodiment avoids the problems associated with patterning a transparent Indium Tin Oxide (ITO) layer on a cover glass into two separate electrodes on the cover glass and subsequent aligning of the top and bottom border electrodes. In the case where the top transparent ITO electrode on the cover glass is patterned into two separate electrodes (one for pixel region and one for borders), it will be appreciated that electrical contact to the pixel region electrode (e.g. layer 230) may require an opening in the border electrode (e.g. layer 250) which surrounds the pixel region electrode in order to have an electrically conductive line contact layer 230 without electrically contacting the border (layer 250).

For one embodiment, display 200 is used in a miniature display device that magnifies the image created on cover glass 260. The sharply defined edge provides the user of the miniature display device with the ability to maintain a constant field of vision when viewing the magnified image (by keeping all of the border in view). The color and orientation of the image border may be set during the manufacturing of display 200. In particular, during the manufacturing process the voltage swing of driver 245 is predetermined and the electrode borders are placed within display 200. For yet another embodiment, the color of the image border is set by manually adjusting the output voltages of driver 245. A user may be presented with a color palette and can select a color in order to distinguish the border from the active display area.

For an alternative embodiment, display 200 is a color display system that generates images using a transmissive liquid crystal display. In a transmissive liquid crystal display, layer 205 comprises a transparent substrate layer such as a conventional polysilicon layer containing thin film transistors which forms a display backplane. Additionally, in a transmissive liquid crystal display a white light source (not shown) is placed beneath layer 205 so that the display backplane is backlit. Accordingly, for this one embodiment, display 200's electrode border 240, electrode border 250, and driver 245 also provide an image border on a transmissive liquid crystal display.

Figure 3:
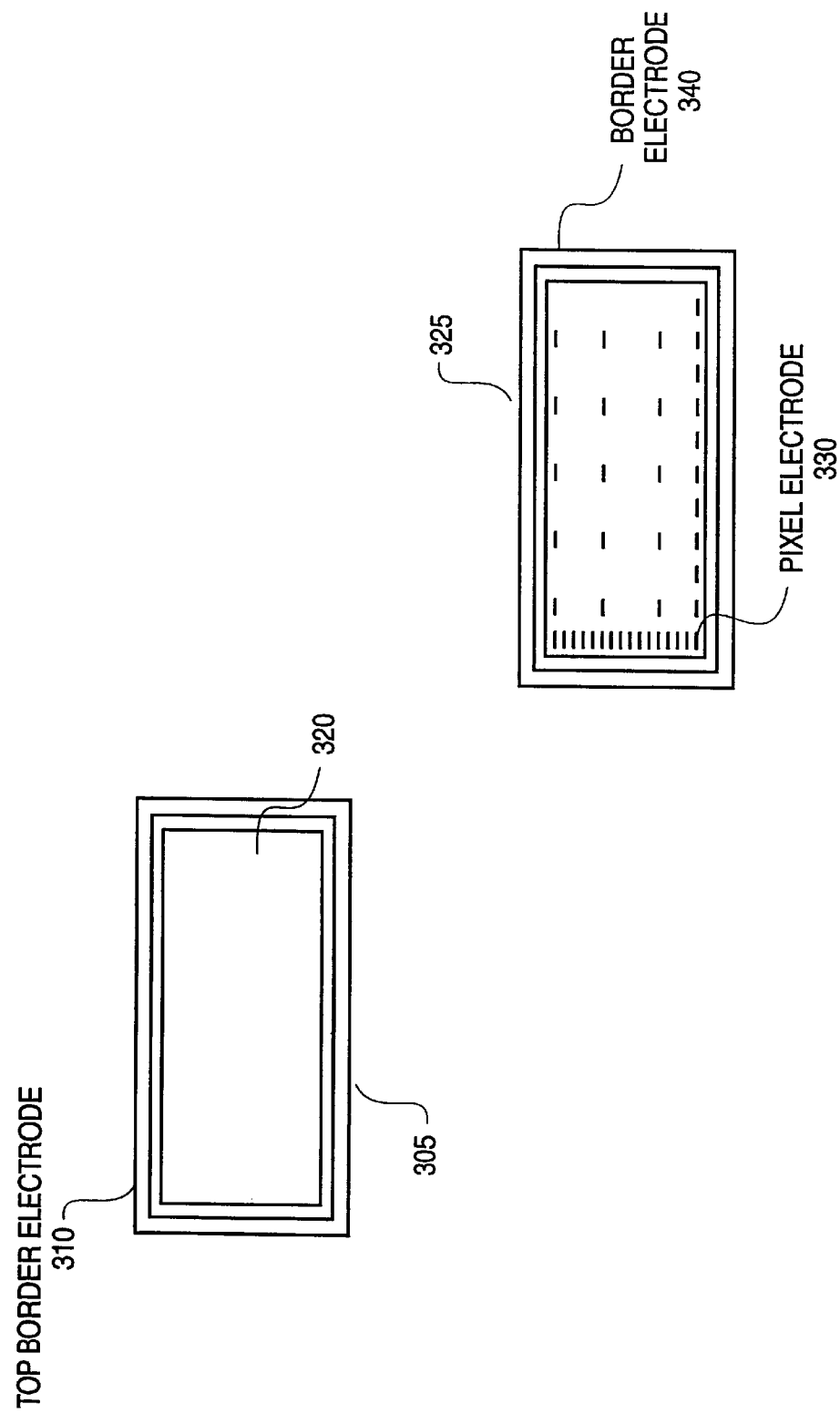
FIG. 3 shows one embodiment of a top and bottom view of a liquid crystal display with an electrode border.

FIG. 3 shows one embodiment of a top view of a liquid crystal display with an electrode border. In particular, top view 305 illustrates the relationship between layer 320 (which corresponds to layer 230 in FIG. 2) and top border electrode 310. For one embodiment, layer 320 comprises a transparent control electrode (e.g. an indium tin oxide layer on a transparent cover glass) used to define an active display area. Additionally, electrode border 310 also is a transparent control electrode used to create a border image on the liquid crystal display (and corresponds to electrode border 250).

FIG. 3 also shows one embodiment of a bottom view of a liquid crystal display with an electrode border. Bottom view 325 illustrates the relationship between an array of pixel electrodes (330) (corresponding to layer 220 of FIG. 2) defining an active display area and border electrode 340 (corresponding to layer 240 in FIG. 2). In particular, a group of pixel electrodes is used to create images in the liquid crystal display. As illustrated in FIG. 3, border electrode 340 comprises a single contiguous border electrode that surrounds the array of pixel electrodes and which is used to create a border image on the liquid crystal display. If the display is a transmissive system then the pixel electrodes 330 and the border electrode 330 are transparent. If the display system is reflective, then these electrodes are reflective mirrors (or there is a reflective mirror layer which can reflect the incident light). To improve the perceived contrast of the image in the liquid crystal display, or to satisfy some aesthetic criteria or preference, the border can be set to an appropriate color. While the border electrodes in FIG. 3 are shown as continuous, it will be appreciated that the borders may be discontinuous segments which effectively surround the active display area.

Furthermore, the color of the border can be used to indicate a status or provide a warning, such as a low-battery warning. Alternatively, a portion of the border could be defined to provide an icon indicating a status or warning, such as a low-battery warning.

Figure 6:
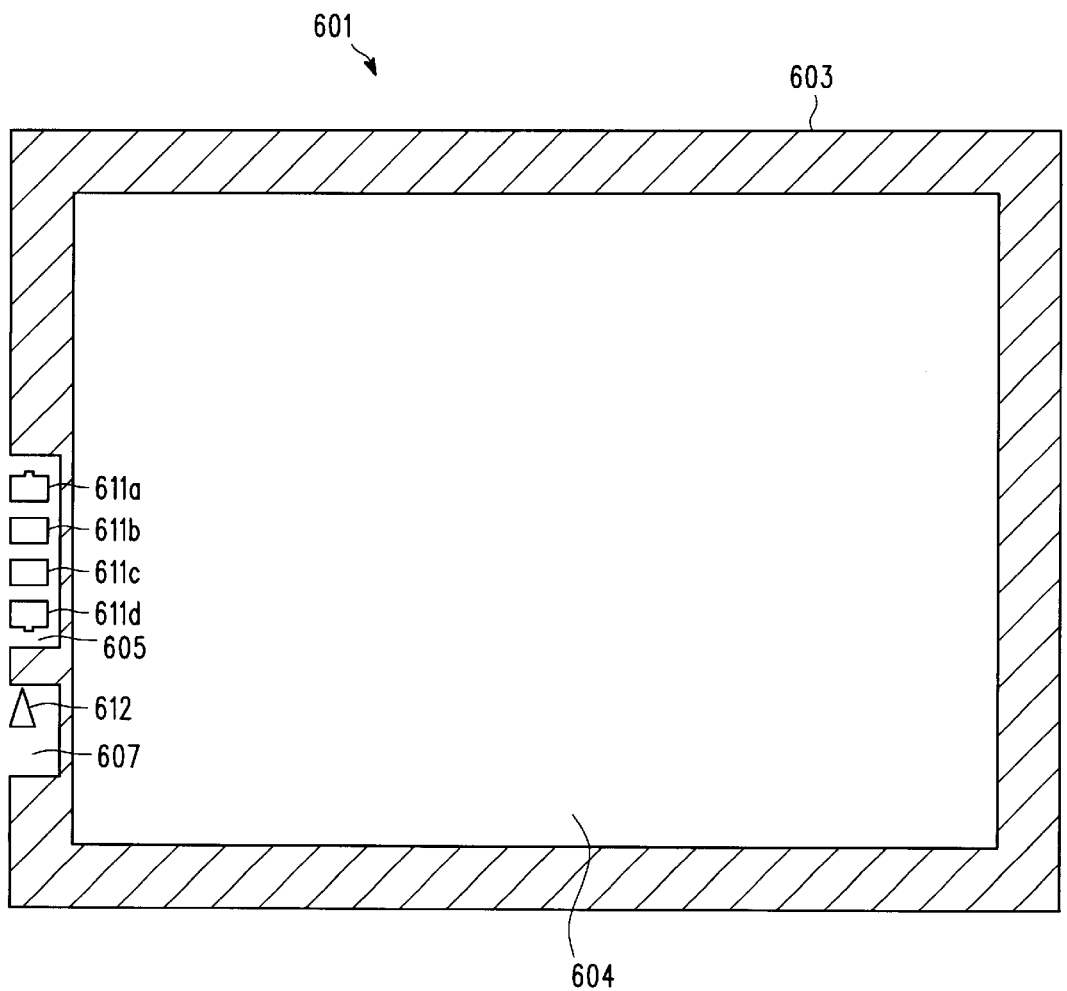
FIG. 6 shows one embodiment of an electrode border which includes a separate electrode (or separate electrodes) for displaying an icon (or icons).

FIG. 6 shows a top view of another embodiment 601 of a border electrode of the present invention. This top view corresponds to the top view of FIG. 3, except that the corresponding transparent cover glass electrode (e.g. layer 320 in FIG. 3) has been omitted in FIG. 6 for purposes of simplifying FIG. 6. It will be understood that an embodiment such as FIG. 6 will normally include such cover glass electrode in region 604 which will be surrounded by an electrode border, such as electrode 603.

The border electrode 603, as with the other embodiments described herein, defines a border region around the active display area. The border electrode 603 will operate in conjunction with another border electrode below it (not shown but corresponding to layer 340 of FIG. 3) to create a voltage between these electrodes to define the color (or gray scale) of the border. The border electrode 603 includes two cut-out regions 605 and 607. These cut-out regions include a battery electrode 611a–611d, which is an icon formed out of several separate electrodes disposed in cut-out region 605. The several separate electrodes 611a–611d can be set to different colors to indicate the charged/discharged state of a battery. For example, if all electrodes 611a–611d are set at a voltage (relative to a single electrode below it or several similarly shaped electrodes below these electrodes 611a–611d) to display the same particular color (e.g. red), then this may indicate the battery is completely discharged. Further, if all these electrodes 611a–611d are set at another voltage to display another particular color (e.g. blue), then this indicates that the battery is completely charged. Intermediate states of the battery may be indicated by setting electrode 611a to display red while electrodes 611b–611d display blue or by setting electrodes 611a and 611b to display red while electrodes 611c and 611d display blue, etc. Each electrode 611a or 611b or 611c or 611d will typically operate with a corresponding bottom electrode below it, which bottom electrode may be shaped similarly to the electrode above it. Each electrode 611a or 611b or 611c or 611d, in conjunction with its corresponding bottom electrode, may set a color which is different than the border's color, thereby creating an icon on the border of the display. Electrode 612 represents a system status icon which is one color (controlled by electrode 612 and its corresponding bottom electrode) to indicate one system state and which is other colors to indicate other system states. In an alternative embodiment in which the top transparent ITO electrode on the cover glass has not been formed as two separate electrodes (but rather this ITO electrode functions as an electrode for both the active display area and the border), then the border and associated icons of FIG. 6 may be formed as mirrors (for a reflective display) or as transparent electrodes on the backplane of the display. For example, the border and icons of FIG. 6 may be formed as electrode mirrors on the same IC substrate as the pixel mirrors for a LCOS (liquid crystal on silicon) display device.

In an alternative embodiment of the present invention, a plastic frame surrounds the array of pixel electrodes. The border electrode, similar to border electrode 340, extends under the plastic frame, which can also be used to conceal bonding wires and other electrical connections and the spacer material. If the edge of the plastic frame is rough or misaligned, the color and brightness of the border electrode can be set to match the color and brightness of the plastic frame such that the edge of the plastic frame is not as conspicuous.

Figure 4:
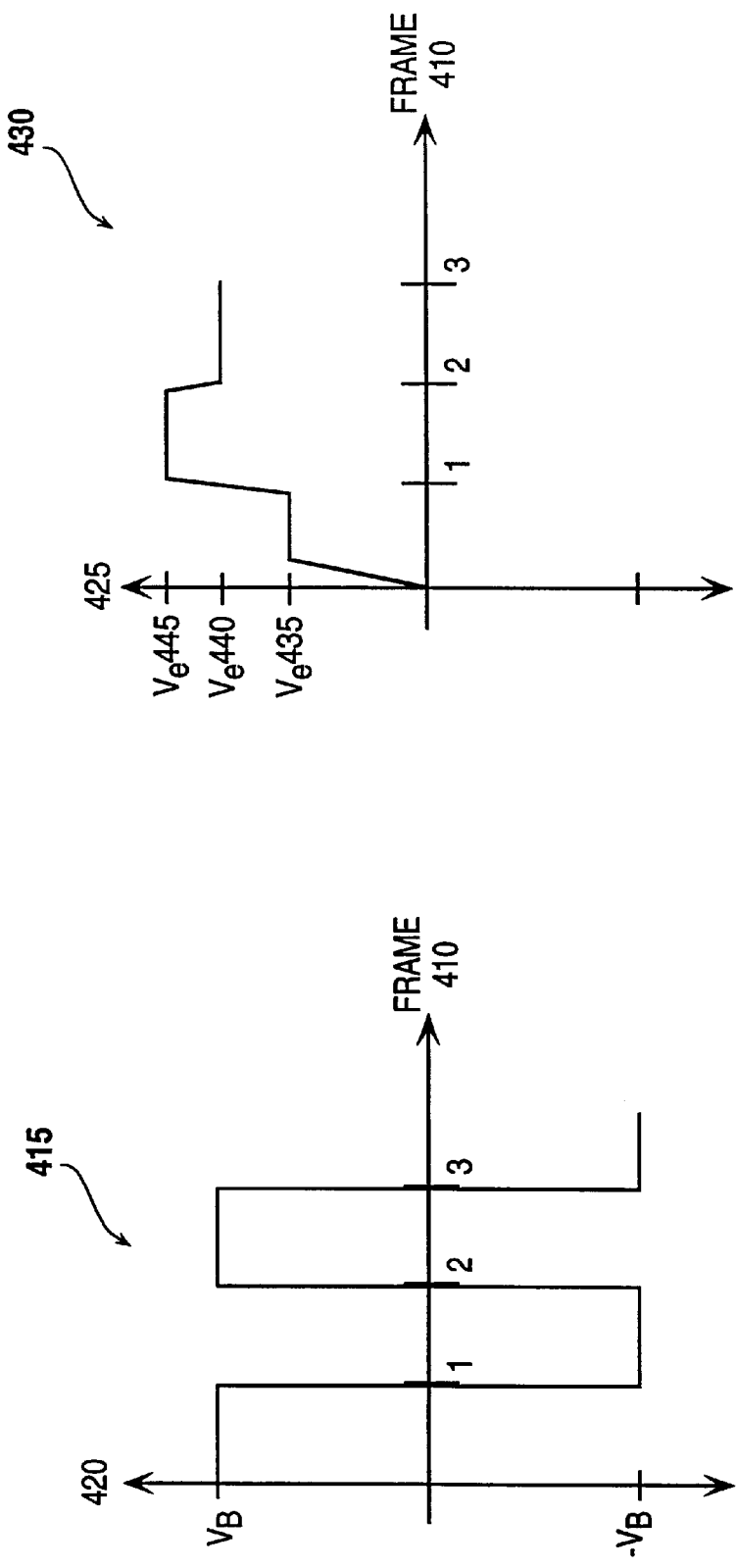
FIG. 4 shows one embodiment of voltage to frame relation for an electrode border and a voltage to frame relation for an electrode pixel of an active display area.

FIG. 4 shows one embodiment of voltage to frame relation for an electrode border. In particular, the vertical axis (420) of graph 415 shows the voltage difference between electrode border 240 and electrode border 250. As previously described, the voltage difference is generated by driver 245 which is coupled to both border electrodes to drive voltages onto these electrodes. The horizontal axis (frame 410) of graph 415 shows a time line of sequential images divided into frames. As illustrated in FIG. 4, for each frame the polarity of the absolute value of voltage $V_B$ applied between electrode border 240 and electrode border 250 interchanges. Accordingly, a DC voltage that is DC balanced over time (at a reference voltage shown as the abscissa of FIG. 4) is set between electrode border 240 and electrode border 250. Applying the DC voltage to the liquid crystal contained between the electrode borders results in a constant image on layer 260 along the area defined by the electrode borders 240 and 250. Alternatively, the voltage over time between electrode borders 240 and 250 may be varied (e.g. as shown in graph 430) to produce a controllable color for the border which varies.

FIG. 4 also shows one embodiment of voltage to frame relation for a pixel electrode. In particular, the vertical axis (425) of graph 430 shows the voltages difference between pixel electrode 330 and layer 320. The voltage difference is generated by drive logic 225. The horizontal axis (frame 410) of graph 430 shows a time line of sequential images divided into frames. As illustrated in FIG. 4, for each frame the voltage applied between pixel electrode 330 and layer 320 varies. Accordingly, pixel electrode 330 is used to define images in frames 1, 2, and 3. For example, in frame 1 the voltages difference between pixel electrode 330 and layer 320 is $V_e$ 435. The voltage value $V_e$ 435 results in pixel electrode 330 generating a given color and intensity for a pixel of the image in frame 1. Similarly, in frames 2 and 3 the different voltages between pixel electrode 330 and layer 320 result in different color and intensity value for the pixel in each frame. For one embodiment, the pixel electrode 300 is adjacent to electrode border 240. The constant image generated by the border electrode, however, contrasts to the changing image created by pixel electrode 330. Accordingly, the electrode border generates a border image that is distinguishable from an active display area created by an array of pixel electrodes.

Figure 5:
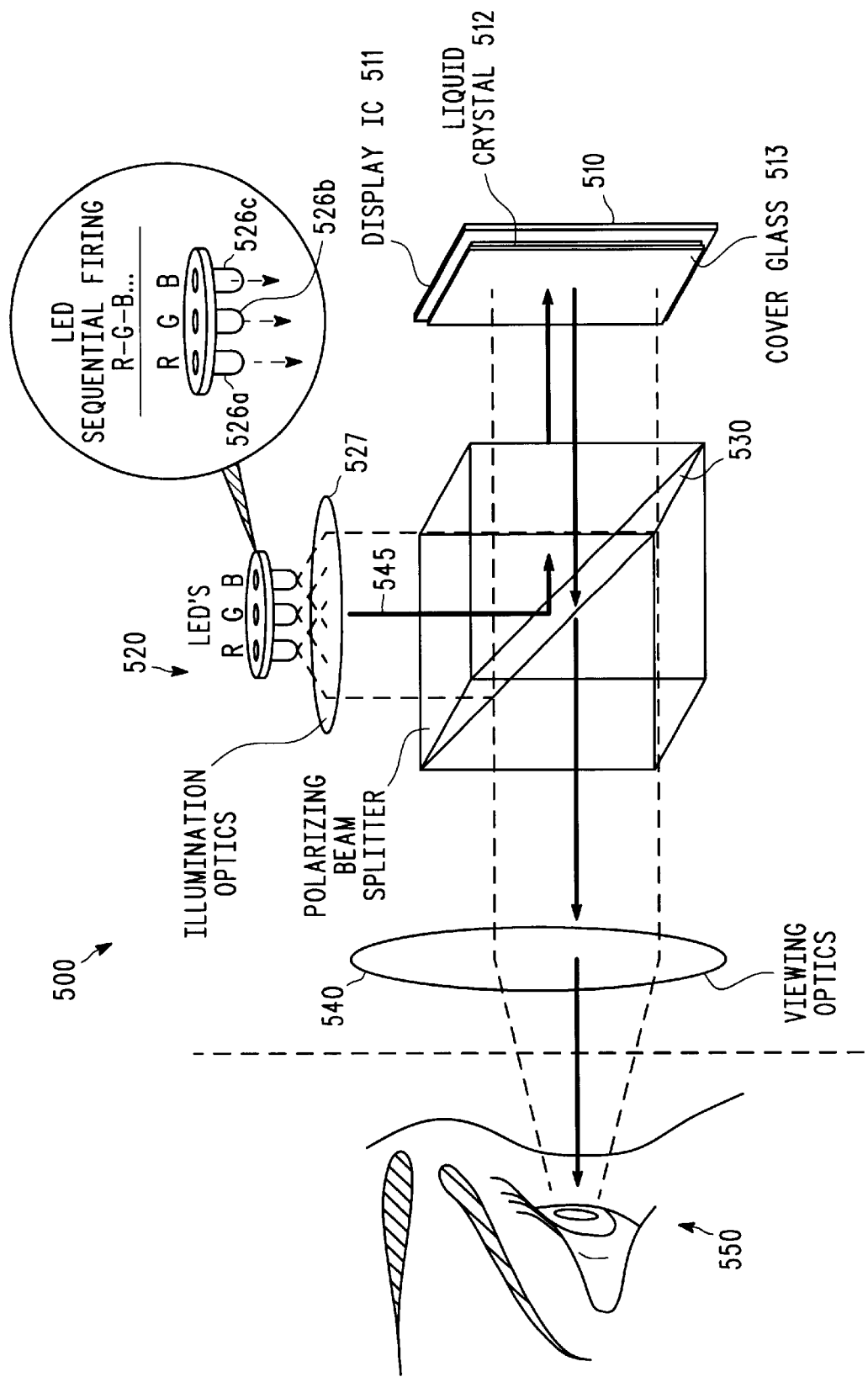
FIG. 5 shows one embodiment of head-mounted display with a liquid crystal display having an electrode border.

FIG. 5 illustrates one embodiment of a head-mounted display with a liquid crystal display. The entire set of components shown in FIG. 5 may be included in a small, lightweight mounting which is mounted in front of user 550 in close proximity to the user's eye. For example, the head-mounted display 500 may be mounted within approximately 1 inch of the viewer's eye and may be housed in a housing which is approximately a 2 inch cube. It will be appreciated that other alternative embodiments may be constructed according to the present description.

Head-mounted display 500 includes a reflective display device 510 which includes a display integrated circuit 511, a liquid crystal layer 512, which is a form of an electro-optic layer or a spatial light modulator, and a coverglass 513. The viewing optics 540 creates a magnified image of the image created by the liquid crystal layer 512. The image on the liquid crystal layer 512 is created by sequentially illuminating a red, a green, and a blue LED over time, using illuminator 520 which includes the three LED's 526a, 526b, and 526c. An illumination optical lens 527 provides the light from the illuminator 520 to a beamsplitter 530 which directs polarized light toward the liquid crystal layer 512.

The beamsplitter 530 is a film having multiple layers which include at least one layer which is an oriented bi-refringent material. For one embodiment, beamsplitter 530 acts as a reflecting polarizer by reflecting light of one polarization and transmitting light of another polarization. Beamsplitter 530 provides this functionality over a wide angle of incidence. That is, light at a perpendicular incidence (90°) will be polarized in substantially the same manner as light having an angle of incidence of substantially less that 90° (e.g. 30° angle of incidence). This property is referred to as a wide angle of acceptance and is described in copending Provisional U.S. Patent Application No. 60/070,216, filed on Dec. 31, 1997 which is hereby incorporated herein by reference.

The polarized light from beamsplitter 530 is directed through the liquid crystal layer 512 toward the reflective pixel electrodes on the display integrated circuit 511 and is reflected from these electrodes back through the liquid crystal layer 512 and towards the beamsplitter 530. The spatial state of the various areas of the liquid crystal layer 512 will determine the image based upon the manner in which light is modulated through the liquid crystal layer 512. For one embodiment, a nematic liquid crystal which is capable of modifying the polarized state of light is assumed to be the light modulating medium used in the reflective display device. It will be appreciated that numerous other light modulating media may also be employed, such as ferro-electric liquid crystals and other types of electro-optical layers which may modulate light in a manner to spatially create an image on a reflective display device.

The modulated light from the reflective display device 510 is directed toward the beamsplitter 530 and passes through the beamsplitter toward the viewing optic lens 540 which creates a magnified image which is a virtual image of the image on the reflective display device 510. The overall path of light from the illuminator 520 to the reflective device 510 and then to the viewing optic lens 540 is shown by the path 545. For one embodiment, liquid crystal 512, display integrated circuit (IC) 511, coverglass 513 comprises components of display 200. Accordingly, display integrated circuit 511 includes an electrode border which surrounds the array of reflective pixel electrodes on the display IC 511. As previously described, the electrode border creates a border image that surrounds the image from the reflective display 510. Thus, the electrode border also creates a virtual border around the virtual image created by viewing optic lens 540. The virtual border provides the user of the miniature display device with the ability to maintain a constant field of vision when viewing the magnified image because the user can, by noting whether the entire border is visible, determine whether the entire field of vision can be seen.

In the foregoing specification, the invention has been described with reference to specific exemplary embodiments thereof. It will, however, be evident that various modifications and changes may be made thereof without departing from the broader spirit and scope of the invention as set forth in the appended claims. For example, one modification may involve an automatic color matching system which examines pixels along the edge of the array of pixels to determine an average color value for these pixels and then determines automatically a complimentary color for the border and generates the appropriate border electrode voltages. The specification and drawings are, accordingly, to be regarded in an illustrative rather than a restrictive sense.

What is claimed is:

1. A display device operable to generate images and a border image, said display device comprising:
   a spatial light modulator display layer;
   an electrode structure coupled to said spatial light modulator display layer, said electrode structure configured to define an active display area;
   a first electrode surrounding said electrode structure; and
   a second electrode coupled to said spatial light modulator display layer, wherein said second electrode is located above said first electrode and wherein a voltage difference between said second electrode and said first electrode generates said border image.

2. The device of claim 1, wherein said spatial light modulator display layer comprises a liquid crystal.

3. The device of claim 2, wherein said display device is a time sequential color display.

4. The device of claim 1, wherein said electrode structure comprises a plurality of pixel electrodes located beneath said spatial modulator display layer and located beneath a portion of said second electrode.

5. The device of claim 4, wherein said first electrode comprises a single contiguous electrode placed adjacent to certain of said plurality of pixel electrodes located along at least one edge of an array of pixel electrodes defined by said plurality of electrodes.

6. The device of claim 1, wherein said second electrode comprises a transparent electrode located above said spatial modulator display layer.

7. The device of claim 6, wherein said second electrode follows the orientation of said first electrode.

8. The device of claim 7, wherein said second electrode follows the dimensions of said first electrode.

9. The device of claim 1, wherein said voltage difference between said second electrode and said first electrode comprises a predetermined voltage value.

10. The device of claim 9, wherein said predetermined voltage value is determined during manufacturing of said display in order to generate a border which is distinguishable from said active display area.

11. The device of claim 9, wherein said predetermined voltage value is determined manually in order to generate a border which is distinguishable from said active display area.

12. A display device having an image border configured to define an active display area, said display device comprising:
- a first layer;
- a substrate layer;
- a spatial modulator display layer coupled between said first layer and said substrate layer;
- a first electrode layer coupled between said first layer and said spatial modulator display layer;
- a second electrode layer;
- a third electrode layer surrounding said first electrode layer;
- a plurality of electrodes coupled to said substrate layer, said plurality of electrodes configured to generate an image on said first layer based on a voltage difference between each electrode of said plurality of electrodes and said first electrode layer; and
- said second electrode layer surrounding said plurality of electrodes and configured to generate said image border on said first layer based on a voltage difference between said second electrode layer and said third electrode layer.

13. The device of claim 12, wherein said spatial light modulator display layer comprises a liquid crystal, and wherein said display device is a microdisplay which generates a directly viewed magnified image, and wherein said display device is contained within a headmounted display assembly.

14. The device of claim 13, wherein said display is a time sequential color display.

15. The device of claim 12, wherein said plurality of electrodes is arranged in a rectangular array and wherein said second electrode layer comprises a single contiguous border electrode which surrounds said plurality of electrodes.

16. The device of claim 12, wherein said voltage difference between said second electrode layer and said third electrode layer comprises a predetermined voltage value.

17. The device of claim 16, wherein said predetermined voltage value is determined during manufacturing of said display in order to generate a border which is distinguishable from said active display area.

18. The device of claim 16, wherein said predetermined voltage value is determined manually in order to generate a border which is distinguishable from said active display area.

19. A display device operable to generate images and a border image, said display device comprising:
- an active display area which generates said images in said active display area;
- a first electrode structure adjacent to said active display area and defining said border image;
- a light modulator display layer coupled to said first electrode structure, said light modulator display layer generating said border image in response to a voltage applied to said first electrode structure;
- a second electrode structure which is coupled to said light modulator display layer and which together with said first electrode structure generates an electric field through said light modulating display layer to generate said border image; and
- a third electrode coupled to said spatial light modulator display layer, said third electrode being disposed in a region defined by said border image for displaying an indicator to a user.

20. A display device as in claim 19 wherein said active display area comprises a display mechanism selected from one of (a) a liquid crystal display; (b) a CRT; (c) an array of light emitting diodes; or (d) a plasma display.

21. A display device as in claim 19 wherein said indicator is an icon.

22. A display device as in claim 21 wherein said icon represents a system state or a battery state.

23. A display device as in claim 21 wherein said icon represents a system state or a battery state.

* * * * *